United States Patent
Chen

(10) Patent No.: US 9,752,363 B2
(45) Date of Patent: Sep. 5, 2017

(54) LOCKING STRUCTURE

(71) Applicant: Wistron Corporation, New Taipei (TW)

(72) Inventor: Hung-Li Chen, New Taipei (TW)

(73) Assignee: WISTRON CORPORATION, New Taipei (TW)

(*) Notice: Subject to any disclaimer, the term of this patent is extended or adjusted under 35 U.S.C. 154(b) by 164 days.

(21) Appl. No.: 14/308,807

(22) Filed: Jun. 19, 2014

(65) Prior Publication Data

US 2015/0300066 A1 Oct. 22, 2015

(30) Foreign Application Priority Data

Apr. 16, 2014 (TW) .............................. 103113943 A

(51) Int. Cl.
*E05C 3/02* (2006.01)
*E05C 3/06* (2006.01)
(Continued)

(52) U.S. Cl.
CPC ........ *E05D 11/1007* (2013.01); *G06F 1/1616* (2013.01); *G06F 1/1626* (2013.01); *G06F 1/1679* (2013.01); *G06F 1/1681* (2013.01)

(58) Field of Classification Search
CPC .... G06F 1/1632; G06F 1/1616; G06F 1/1643; Y10T 292/0914; Y10T 292/1076; Y10T 70/5009; E05D 11/1007

(Continued)

(56) References Cited

U.S. PATENT DOCUMENTS 1,875,768 A * 9/1932 Smith .................. E05B 63/125
292/213
3,843,175 A * 10/1974 Klebba ................. E05B 85/243
292/216

(Continued)

FOREIGN PATENT DOCUMENTS

CN 202098749 1/2012
TW 201116729 5/2011

OTHER PUBLICATIONS

Office Action issued in corresponding application Taiwan and its English translation (dated Jul. 22, 2015).

*Primary Examiner* — Kristina Fulton
*Assistant Examiner* — Faria Ahmad
(74) *Attorney, Agent, or Firm* — McClure, Qualey & Rodack, LLP

(57) ABSTRACT

A locking structure for securing an electronic device includes a body, a worm shaft, a guide rod, a fixing base and a linkage set. When a user wants to connect the electronic device to another device, the user could insert the electronic device into the locking structure which is set on the device. Then, the user pushes down the electronic device to drive the locking structure and the worm shaft of the locking structure would be rotated from a releasing direction to a securing direction. When the user wants to release the electronic device, the user could push it back to the original position. Then, the worm shaft would be rotated from the securing direction to the releasing direction so the user could release the electronic device from the locking structure. Consequently, it is easy to secure or release the electronic device to another device through the locking structure.

11 Claims, 13 Drawing Sheets

(51) Int. Cl.
*E05C 19/00* (2006.01)
*E05C 21/00* (2006.01)
*E05D 11/10* (2006.01)
*G06F 1/16* (2006.01)

(58) Field of Classification Search
USPC .... 292/1, 194, 195, 198, 200, 196, DIG. 17, 292/DIG. 53, DIG. 54; 361/679.57–679.58; 70/58; 248/686, 248/217.1, 309.2, 310
See application file for complete search history.

(56) References Cited

U.S. PATENT DOCUMENTS

| | | | | |
|---|---|---|---|---|
| 3,886,771 | A * | 6/1975 | Robins | E05C 19/18 292/288 |
| 4,702,095 | A * | 10/1987 | Ben-Asher | E05B 47/023 292/201 |
| 5,701,769 | A * | 12/1997 | Hall | E05B 71/00 70/14 |
| 5,870,281 | A * | 2/1999 | Kim | G06F 1/1616 16/319 |
| 5,961,162 | A * | 10/1999 | Glaser | E05B 9/08 292/198 |
| 6,212,918 | B1 * | 4/2001 | Kravtin | E05B 73/0005 248/551 |
| 6,591,642 | B1 * | 7/2003 | Kuo | E05B 73/0005 70/14 |
| 6,918,272 | B1 * | 7/2005 | Sanders | E05B 73/0005 70/14 |
| 6,968,716 | B1 * | 11/2005 | Ling | E05B 73/0005 70/14 |
| D660,682 | S * | 5/2012 | Mahaffey | D8/330 |
| 8,517,434 | B1 * | 8/2013 | Reep, Sr. | E05C 3/16 292/200 |
| 8,578,744 | B2 * | 11/2013 | Yu | E05B 73/0082 70/14 |
| 8,640,512 | B2 * | 2/2014 | Wu | E05B 73/0082 70/14 |
| 2006/0112740 | A1 * | 6/2006 | Merrem | E05B 73/0082 70/58 |
| 2006/0268505 | A1 * | 11/2006 | Krah | G06F 1/1616 361/679.41 |
| 2008/0174943 | A1 * | 7/2008 | Hirasawa | G06F 1/1616 361/679.27 |
| 2009/0284917 | A1 * | 11/2009 | Morooka | G06F 1/162 361/679.58 |
| 2010/0321882 | A1 * | 12/2010 | Tracy | G06F 1/1616 361/679.55 |
| 2011/0146358 | A1 * | 6/2011 | Avganim | E05B 73/0005 70/58 |
| 2011/0167881 | A1 * | 7/2011 | Avganim | E05B 73/0005 70/58 |
| 2011/0179834 | A1 * | 7/2011 | Mahaffey | E05B 27/083 70/58 |
| 2012/0006080 | A1 * | 1/2012 | Yu | E05B 37/02 70/58 |
| 2012/0167647 | A1 * | 7/2012 | Yu | E05B 73/0082 70/448 |
| 2012/0216581 | A1 * | 8/2012 | Tsai | E05B 73/0005 70/58 |
| 2012/0227448 | A1 * | 9/2012 | Su | E05B 73/0005 70/58 |
| 2013/0033817 | A1 * | 2/2013 | Wu | E05B 73/0082 361/679.58 |
| 2014/0355210 | A1 * | 12/2014 | Hashimoto | G06F 1/1679 361/679.58 |

* cited by examiner

LOCKING STRUCTURE

CROSS-REFERENCES TO RELATED APPLICATIONS

This non-provisional application claims priority under 35 U.S.C. §119(a) on Patent Application No. 103113943 filed in Taiwan, R.O.C. on 2014 Apr. 16, the entire contents of which are hereby incorporated by reference.

BACKGROUND

Technical Field

The disclosure relates to a locking structure, and particularly to a locking structure for fixing the electronic device at a specific position.

Related Art

Along with the invention of the smart phones, tablet PCs are used to replace the notebook gradually. However, either the smart phones or the tablet PCs, are absent from keyboard and have smaller screens than the notebooks have usually; besides, the hardware of these electronic devices are lower leveled than those of the notebooks. Consequently, the electronic devices are externally connected to other apparatuses like monitors, keyboards, or laptop computers to temporarily extend the usage of the electronic devices. Meanwhile, connectors or positioning members are required to connect and fasten the electronic devices with different apparatuses A conventional fastening structure applies the connector structure to fasten the electronic device with the extension apparatuses; or, a simple pressable buckle is assembled on the conventional fastening structure to connect the electronic device with the extension apparatuses. However, most of the conventional fastening structures are detached from the electronic devices (or the extension devices), easily due to the poor fastening; or, when the buckle is pressed unintentionally, the electronic device is detached from the extension devices. For example, for connecting the tablet PC to the monitor, a connector and a fastening structure are assembled at the front portion of the tablet PC, so that the tablet PC is connected to the monitor via the connector, and the connection between the tablet PC and the monitor is maintained by the fastening structure. However, if the fastening structure is a pressable buckle, when the buckle is pressed unintentionally the tablet PC is detached from the monitor; even more inconveniently, the tablet PC may be broken by its fall to the ground.

SUMMARY

In view of this, the disclosure provides a locking structure, provided for fixing an electronic device. The locking structure includes a body, a worm shaft, a guide rod, a fixing base and a linkage set. The worm shaft is pivotally assembled to the body, and the worm shaft includes a rotating shaft, a guide rail and a locking member. The guide rail is annularly assembled on the rotating shaft, and the locking member is securely assembled at an end portion of the rotating shaft. The guide rod is disposed on the body, and one of two ends of the guide rod slidably assembled to the guide rail of the worm shaft. The fixing base and the linkage set are both pivotally assembled to the body. One end of the linkage set is abutted against the fixing base, and another end of the linkage set is connected to the guide rod. When the electronic device pushes the body to rotate the body by using the fixing base as a rotating center, the worm shaft axially rotates to allow the locking member to rotate from a releasing direction to a securing direction.

Based on this, when the user wants to connect the electronic device with another extension apparatus, the electronic device is assembled to the locking structure to allow the electronic device pushing the locking structure, so that the locking member of the worm shaft is rotated from the releasing direction to the securing direction, so the electronic device connects with the locking structure. Since the locking structure is assembled on the extension apparatus, the electronic device can be fastened with the extension apparatus via the locking structure. Upon detaching the electronic device from the extension apparatus, the electronic device is lifted up to return to the initial position, the locking member of the worm shaft being rotated from the securing direction to the releasing direction so as to detach the electronic device from the locking structure. Based on this, the electronic device is connected to or detached from the locking structure simply and conveniently.

The detailed features and advantages of the disclosure are described below in great detail through the following embodiments; the content of the detailed description is sufficient for those skilled in the art to understand the technical content of the disclosure and to implement the disclosure there accordingly. Based upon the content of the specification, the claims, and the drawings, those skilled in the art can easily understand the relevant objectives and advantages of the disclosure.

BRIEF DESCRIPTION OF THE DRAWINGS

The disclosure will become more fully understood from the detailed description given herein below for illustration only and thus not limitative of the disclosure, wherein.

DETAILED DESCRIPTION

Figure 1:
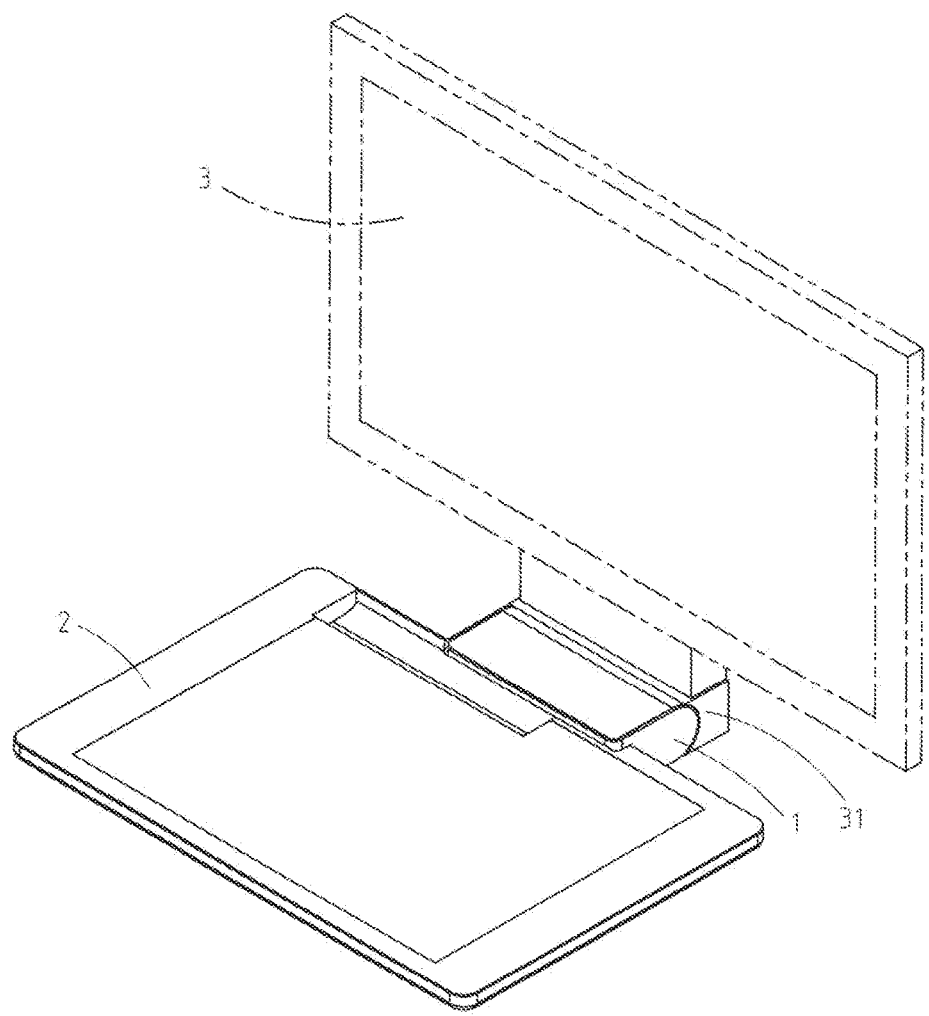
FIG. 1 is an application schematic view (1) of a locking structure of a first embodiment of the disclosure.
Figure 2:
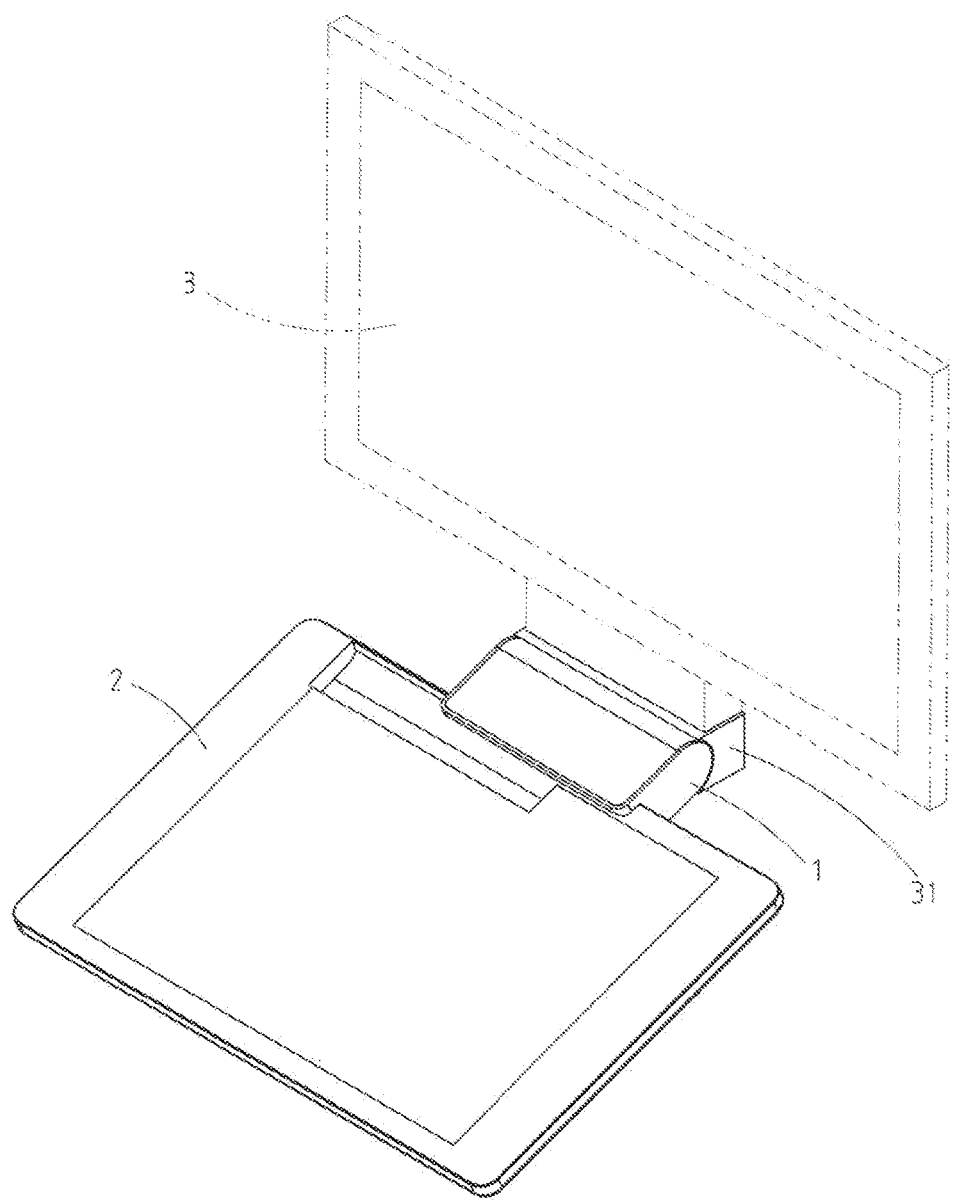
FIG. 2 is an application schematic view (2) of the locking structure of the first embodiment of the disclosure.

Please refer to FIG. 1 and FIG. 2, which are application schematic views (1) and (2) of a locking structure 1 of a first embodiment of the disclosure. As shown, the locking structure 1 is provided for fixing an electronic device 2 on a holder 31 of a screen 3. When the user wants to assemble the electronic device 2 on the holder 31 of the screen 3 to connect the electronic device 2 with the screen 3 for displaying the information of the electronic device 2 on the screen 3, the electronic device 2 is firstly engaged with the locking structure 1 assembled on the holder 31, as shown in FIG. 1. Next, as shown in FIG. 2, by using the locking structure 1 as a rotating center, the electronic device 2 is rotated downwardly by gravity, so that the electronic device 2 is fastened at the holder 31 of the screen 3 because of the locking structure 1. Based on this, the electronic device 2 is connected with the screen 3 via a proper engagement, so that the electronic device 2 is protected from being detached from the screen 3.

The interior structure and the operational principle of the locking structure 1 are described as following. Please refer to FIG. 3 to FIG. 5, which are respectively an exploded view, a partial enlarged view, and a schematic view of parts of the components of the locking structure 1 of the first embodiment. The locking structure 1 of the first embodiment includes a body 11, a worm shaft 12, a guide rod 13, a fixing base 14 and a linkage set 15.

Figure 5:
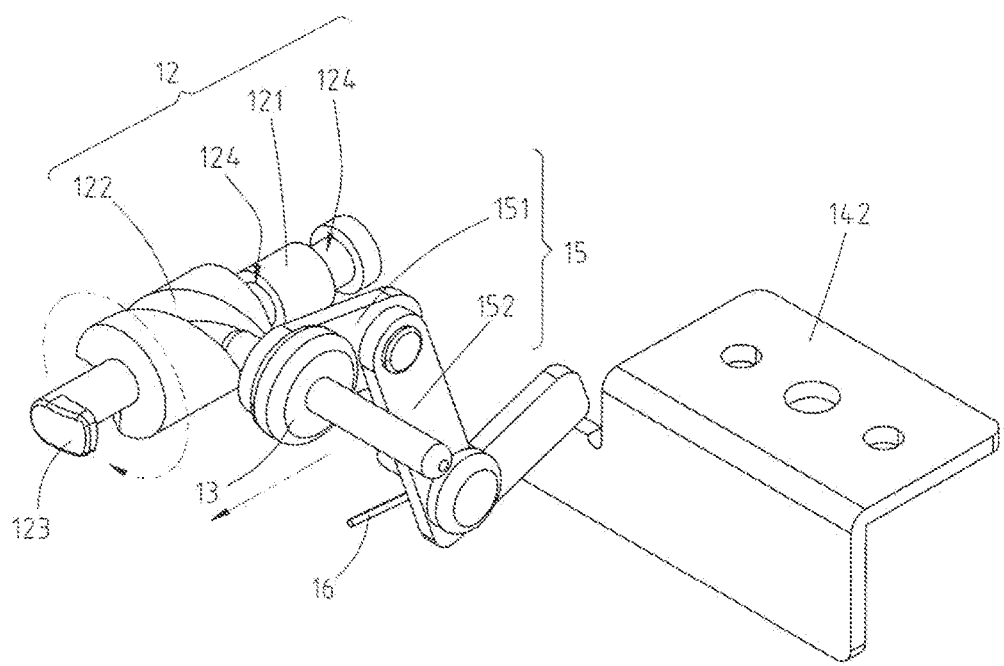
FIG. 5 is a schematic view of parts of the components of the locking structure of the first embodiment of the disclosure.

The body 11 is approximately formed as U-shaped. The worm shaft 12 is pivotally assembled to the inner side of the body 11, so that the worm shaft 12 is self rotatable. The worm shaft 12 includes a rotating shaft 121, a guide rail 122 and a locking member 123. The guide rail 1221 is annularly assembled on the rotating shaft 121. The locking member 123 is securely assembled at an end portion of the rotating shaft 121. As shown in FIG. 5, the locking member 123 is a hook portion. In order to allow the worm shaft 12 to self-rotate at the inner side of the body 1, and to concern about the convenience of the manufacturing, the body 11 includes two positioning portions 111, and the rotating worm shaft 12 includes two positioning grooves 124 annularly disposed. When the worm shaft 12 is assembled with the body 11, the two positioning portions 111 are disposed in the two positioning grooves 124 respectively, so that with the positioning between the two positioning grooves 124 and the two positioning portions 111, the worm shaft 12 is self rotatable in the positioning portion 111 by using the rotating shaft 121 as a rotating center. The number of the positioning groove 124 and the positioning portion 111 are depended according to user requirements, embodiments are not limited thereto.

Figure 4:
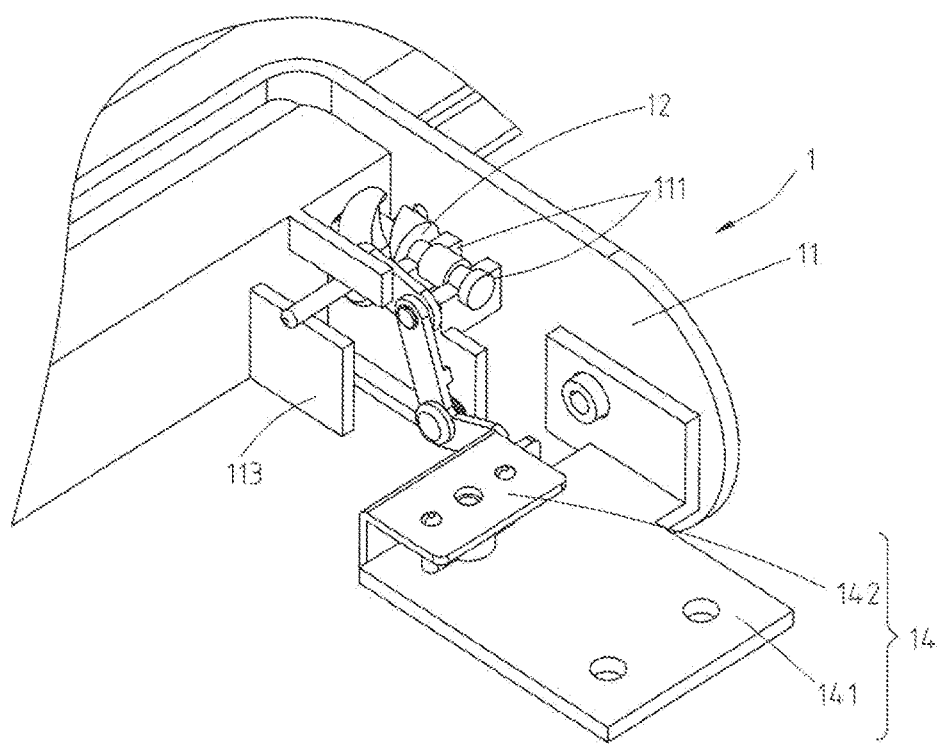
FIG. 4 is a partial enlarged view of the locking structure of the first embodiment of the disclosure.

The guide rod 13 is disposed on the body 1, and one of two ends of the guide rod 13 is slidably assembled to the guide rail 122 of the worm shaft 12. As shown in FIG. 4 and FIG. 5, the body 11 includes a supporting member 113 protruded, and the other end of the guide rod 13 is slidably assembled to the supporting member 113, so that the guide rod 13 is balanced through the supporting member 113.

The fixing base 14 and the linkage set 15 are both pivotally assembled to the body 1. One end of the linkage set 15 is abutted against the fixing base 14, and another end of the linkage set 15 is connected to the guide rod 13. As shown in FIG. 4 and FIG. 5, the linkage set 15 includes a first linkage rod 151 and a second linkage rod 152. One of two ends of the first linkage rod 151 is connected to the guide rod 13, and the other end of the first linkage rod 151 is pivotally connected to one of two ends of the second linkage rod 152. The second linkage rod 152 is pivotally assembled to the body 11, and the other end of the second linkage rod 152 which is not pivotally connected to the first linkage rod 151, is abutting against the fixing base 14. In this embodiment, the second linkage rod 152 is L-profiled, and the second linkage rod 152 is pivotally assembled to the body 11 using the perpendicular portion of the second linkage rod 152 as the pivoting center.

Figure 3:
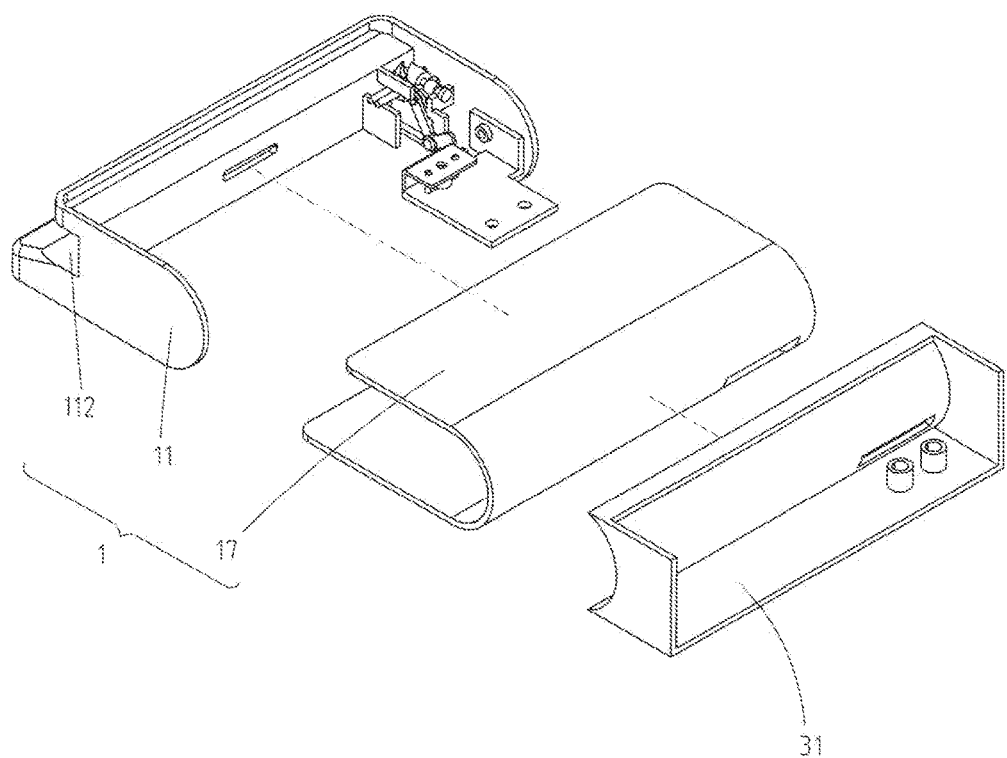
FIG. 3 is an exploded view of the locking structure of the first embodiment of the disclosure.

The fixing base 14 includes a fixing plate 141 and an abutting member 142. The fixing plate 141 is pivotally assembled to the body 11, and the abutting member 142 is securely assembled to the fixing plate 141. Additionally, as shown in FIG. 3, one of two ends of the fixing plate 141 is locked with the holder 31 of the screen 3, and the second linkage rod 152 of the linkage set 15 is abutting against the abutting member 142. In this embodiment, since the abutting member 142 is contacted and rubbed with the linkage set 15 frequently, the abutting member 142 is a plastic component; while in order to enhance the strength of the fixing plate 141, the fixing plate 141 is a metal component. Based on this, screws are applied to fasten the fixing plate 141 with the abutting member 142. In some implementation aspects, the fixing plate 141 and the abutting member 142 are both made from plastic or metal, and are formed integrally as a whole, so that a locking process is omitted during the manufacturing.

Figure 6:
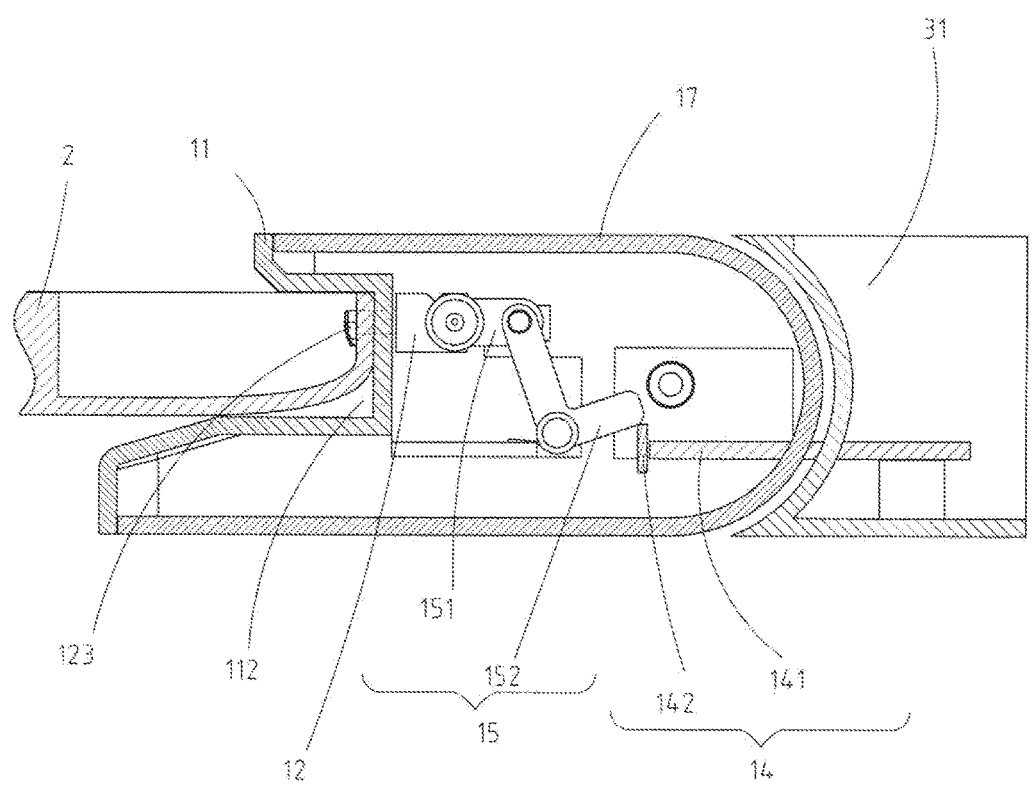
FIG. 6 is a sectional view of the locking structure of the first embodiment of the disclosure.
Figure 7:
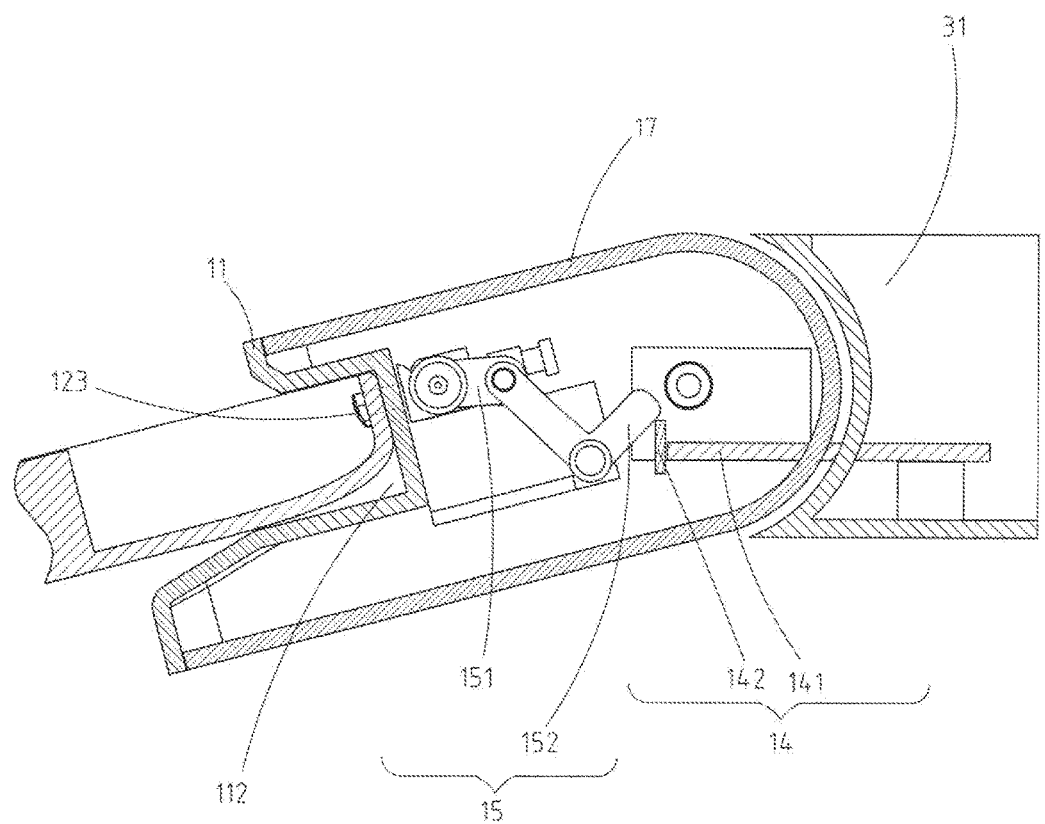
FIG. 7 is a sectional view of the locking structure shown in FIG. 2.
Figure 8:
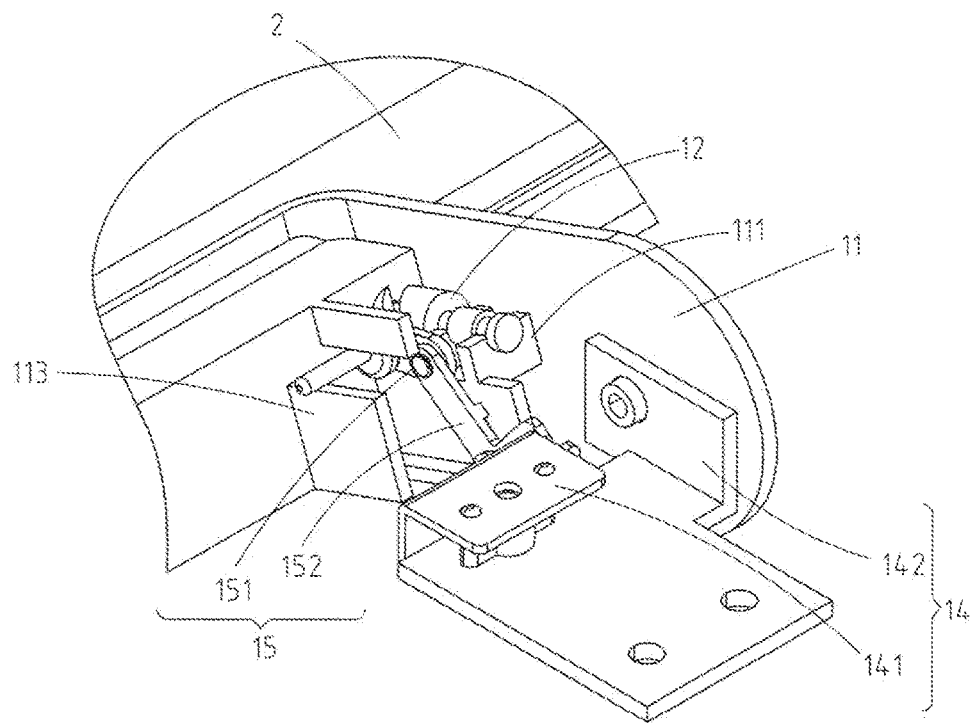
FIG. 8 is an operational view (1) of the locking structure of the first embodiment of the disclosure.
Figure 9:
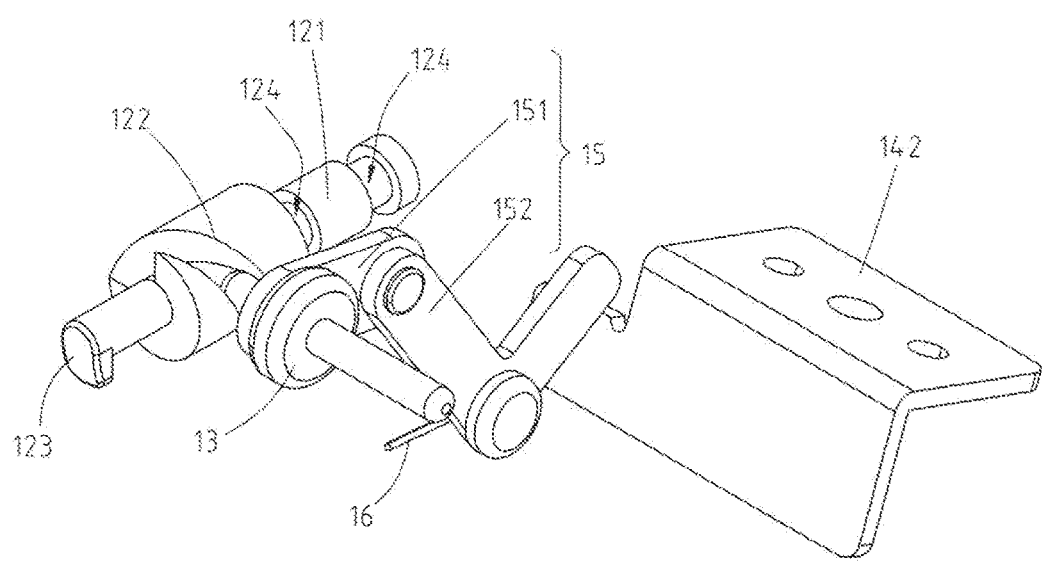
FIG. 9 is an operational view (2) of the locking structure of the first embodiment of the disclosure.

Next, please refer to FIG. 1, FIG. 2 and FIG. 6 to FIG. 9, in which FIG. 6 is a sectional view of the locking structure 1 of the first embodiment, FIG. 7 is a sectional view of the locking structure 1 shown in FIG. 2, FIG. 8 is an operational view (1) of the locking structure 1 of the first embodiment, and FIG. 9 is an operational view (2) of the locking structure 1 of the first embodiment. As shown in FIG. 6, the body 11 includes an engaging groove 112 disposed, and the engaging groove 112 is opposite to the fixing base 14. The locking member 123 of the worm shaft 12 is protrudingly assembled in the engaging groove 112. When the electronic device 2 is engaged in the engaging groove 112, the locking member 123 is correspondingly inserted into the electronic device 2.

As shown in FIG. 2, FIG. 7 and FIG. 8, when the electronic device 2 is engaged with the engaging groove 112, the electronic device 2 is rotated downward in the presence of gravity; meanwhile, the electronic device 2 pushes the body 11 to rotate the body 11 by using the fixing plate 141 as a rotating center. As shown in FIG. 7, since the fixing base 141 is secured, when the body 11 rotates counterclockwise, the body 11 drives the second linkage rod 152 which is pivotally assembled to the body 11; meanwhile, the second linkage rod 152 with one end thereof abutting against the abutting member 142, rotates counterclockwise because of the abutting of the abutting member 142. Next, the second linkage rod 152 pushes the first linkage rod 151 which is pivotally connected thereto, to move toward the electronic device 2.

As shown in FIG. 8 and FIG. 9, when the first linkage rod 151 is driven to move toward the Y axis direction indicated in the figures, the first linkage rod 151 pushes the guide rod 13 to move toward the Y axis direction; at the same time, since one end of the guide rod 13 is slidably assembled in the guide rail 122 of the worm shaft 12, when the guide rod 13 moves toward Y axis direction to abut against the guide rail 122, the worm shaft 12 is driven to rotate by using the rotating shaft 121 as a rotating center. As shown in FIG. 9, hence the rotating shaft 121 is rotated clockwise, and the direction of the hook portion of the locking member 123 is changed, from being parallel to the X axis direction to being parallel to the Z axis direction. Here, when the hook portion of the locking member 123 is parallel to the X axis direction, the locking member 123 is defined in a releasing direction; while when the hook portion of the locking member 123 is rotated to be parallel to the Z axis direction, the locking member 123 is defined in a securing direction. When the locking member 123 is rotated to the securing direction, the hook portion of the locking member 123 which is inserted into the electronic device 2 is hooked with the electronic device 2, so that the electronic device 2 is securely connected with the locking structure 1.

Figure 10:
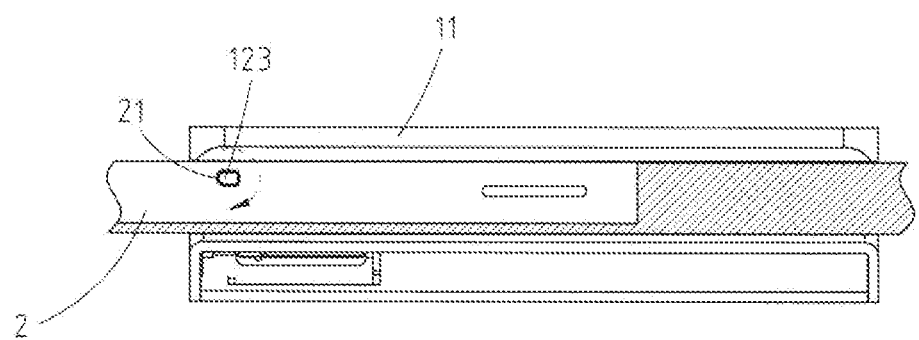
FIG. 10 is an operational view (1) of a locking member of the locking structure of the first embodiment of the disclosure.
Figure 11:
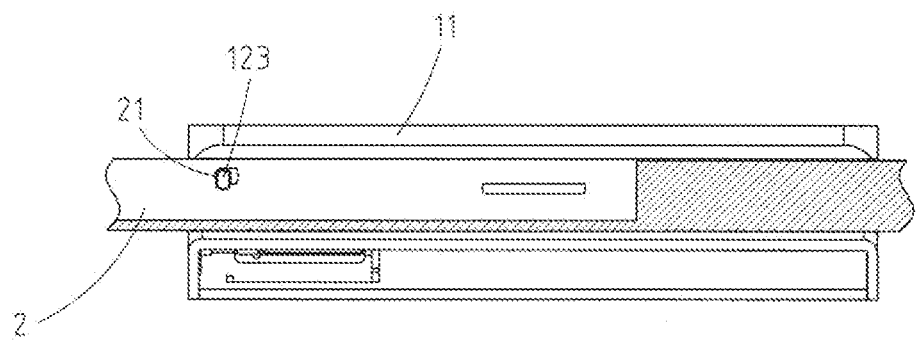
FIG. 11 is an operational view (2) of the locking member of the locking structure of the first embodiment of the disclosure.

Please refer to FIG. 10 and FIG. 11, which are operational views (1) and (2) of the locking member 123 of the locking structure 1 of the first embodiment. FIG. 10 and FIG. 11 are illustrated in a direction from the interior of the housing of the electronic device 2 toward the locking structure 1. The electronic device 2 includes a through hole 21 opened, and the through hole 21 is provided for inserting the locking member 123. As shown in FIG. 6, when the electronic device 2 is engaged in the engaging groove 112, the locking member 123 is correspondingly inserted into the electronic device 2, and the locking member 123 is in the releasing direction. When the electronic device 2 is rotated downward in the presence of the gravity to drive the locking structure 1 to operate in a manner as mentioned above, so that the locking member 123 is rotated to a state as shown in FIG. 11; that is, the locking member 123 is rotated to the securing direction. At this moment, as shown in FIG. 11, the hook portion of the locking member 123 is hooked with the housing of the electronic device 2, so that the electronic device 2 is connected with the locking structure 1 securely.

As shown in FIG. 1 and FIG. 3, in order to protect the components within the body 11, the locking structure 1 includes a cover 17 provided to enclose the body 11, to protect the components within the body 11, and to allow the appearance of the locking structure 1 being more attractive. Please refer to FIG. 3 to FIG. 6 again, in which the fixing plate 141 of the fixing base 14 is passing through the cover 17 to lock with the holder 31. Based on this, the locking structure 1 is connected with the holder 31; when the electronic device 2 is connected with the locking structure 1 securely, the electronic device 2 is fastened on the holder 31 of the screen 3.

Figure 12:
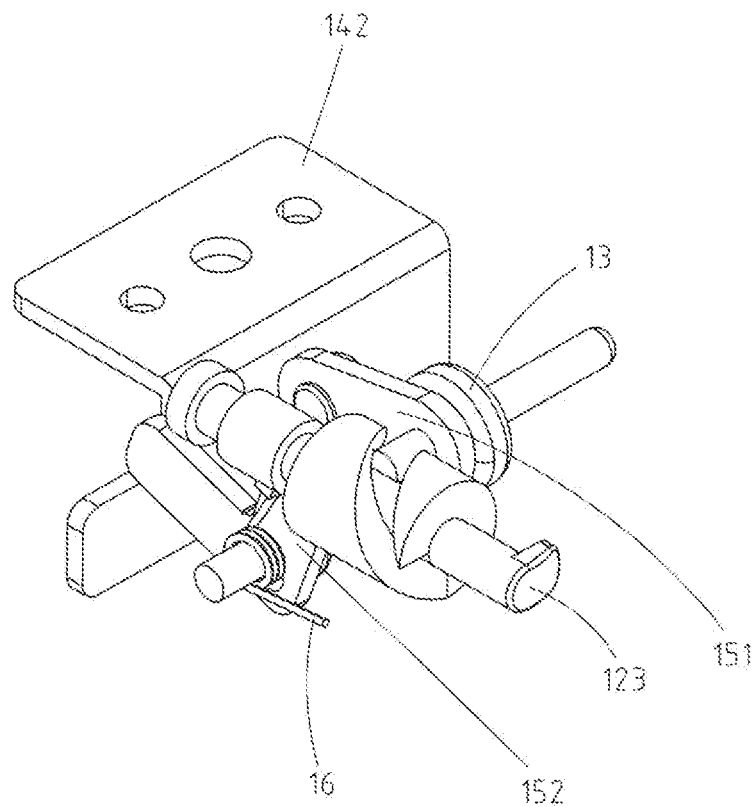
FIG. 12 is a perspective view of the locking structure of the first embodiment of the disclosure.

Please refer to FIG. 4 and FIG. 12, in which FIG. 12 is a perspective view of the locking structure 1 of the first embodiment. As shown, the locking structure 1 further includes a torsion spring 16 disposed on the body 11. One of two ends of the torsion spring 16 is abutted against the body 11, and the other end of the torsion spring 16 is abutted against the second linkage rod 152 of the linkage set 15. When the user tends to detach the electronic device 2 from the locking structure 1, the electronic device 2 is lifted up to return back to a horizontal position, as shown in FIG. 6. Meanwhile, the abutting force applied to the second linkage rod 152 of the linkage set 15 is disappeared, and the second linkage rod 152 is recovered to the initial position in the presence of the recovering force provided by the torsion spring 16.

Please refer to FIG. 9, in which the second linkage rod 152 drives the first linkage rod 151 to move along a direction opposite to the Y axis direction at the time the second linkage rod 152 is recovered back to the initial position, and the first linkage rod 151 drives the guide rod 13 to move toward a direction opposite to the Y axis direction. At this time, with the interaction between the guide rod 13 and the guide rail 122 of the worm shaft 12, the worm shaft 12 is rotated counterclockwise by using the rotating shaft 121 as a rotating center, such that the locking member 123 of the worm shaft 12 is rotated from the securing direction to the releasing direction. Therefore, the user can take the electronic device 2 from the engaging groove 112.

Based on the structure and the operation of the locking structure 1, when the user tends to connect the electronic device 2 with the screen 3, the electronic device 2 is inserted into the engaging groove 112, so that the electronic device 2 drives the body 11 of the locking structure 1 to rotate downward in the presence of gravity, thereby locking the electronic device 2 with the locking structure 1. Since the locking structure 1 is provided to lock with the holder 31 of the screen 3, the electronic device 2 is correspondingly assembled to the screen 3. Based on this, the user connects the electronic device 2 with the screen 3 securely and simply via the locking structure 1, so that the information of the electronic device 2 is displayed on the screen 3. When the user wants to detach the electronic device 2 from the screen 3, the electronic device 2 is lifted up, thereby the electronic device 2 being detached from the screen 3 and the connection between the electronic device 2 and the locking structure 1 being released. Additionally, since the locking structure 1 and the electronic device 2 are connected by the hook portion of the locking member 123 and the hook portion is hooked with the housing of the electronic device 2, when the electronic device 2 (or the locking structure 1) is shaken or pulled forcefully, the connection between the screen 3 and the electronic device 2 is still maintained; that is, the structure of the present invention is steady and the conventional unintentional pressing issue can be avoided.

Figure 13:
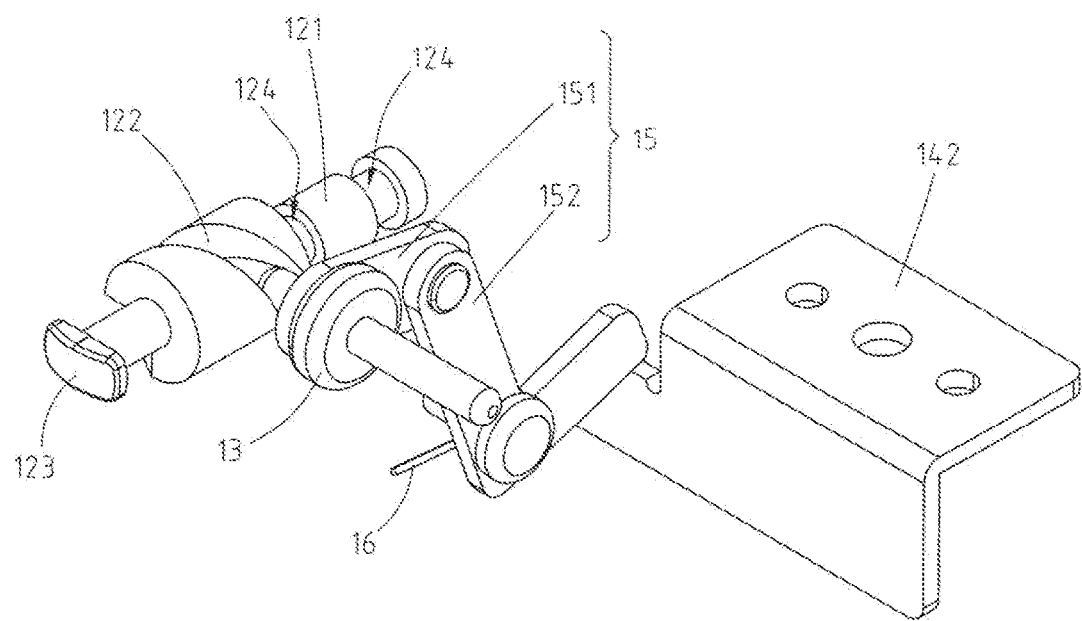
FIG. 13 is a schematic view of parts of the components of a locking structure of a second embodiment of the disclosure.

Please refer to FIG. 13, which is a schematic view of parts of the components of a locking structure 1 of a second embodiment. The structure of the second embodiment is approximately the same as the first embodiment, except that in the first embodiment, the locking member 123 is the hook portion; while in the second embodiment, the locking member 123 is an anchor shaped hook member. The structure of the anchor shaped hook member allows the engagement between the locking structure 1 and the housing of the electronic device 2 being much secured, and the electronic device 2 is difficult to detach from the locking structure 1 when forced.

While the disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A locking structure, provided for securing an electronic device, the locking structure comprising:
   a body;
   a worm shaft, pivotally assembled to the body, the worm shaft comprising a rotating shaft, a guide rail and a locking member, the guide rail annularly assembled on the rotating shaft, the locking member securely assembled at an end portion of the rotating shaft;
   a guide rod, disposed on the body, one of two ends of the guide rod slidably assembled to the guide rail of the worm shaft;
   a fixing base, pivotally assembled to the body; and
   a linkage set, pivotally assembled to the body, one end of the linkage set abutting against the fixing base, and another end of the linkage set connected to the guide rod;
   wherein when the electronic device pushes the body to rotate the body by using the fixing base as a rotating center, which causes the worm shaft to axially rotate to allow the locking member to rotate from a releasing direction to a securing direction.

2. The locking structure according to claim 1, wherein the linkage set comprises a first linkage rod and a second linkage rod, one of two ends of the first linkage rod is connected to the guide rod, and the other end of the first linkage rod is pivotally connected to one of two ends of the second linkage rod, the second linkage rod is pivotally assembled to the body, and the other end of the second linkage rod which is not pivotally connected to the first linkage rod is abutting against the fixing base.

3. The locking structure according to claim 2, wherein the second linkage rod is L-profiled, the second linkage rod is pivotally assembled to the body using the perpendicular portion of the second linkage rod as the pivoting center.

4. The locking structure according to claim 1, further comprising a torsion spring disposed on the body, wherein one of two ends of the torsion spring is abutted against the body, the other end of the torsion spring is abutted against the linkage set.

5. The locking structure according to claim 1, wherein the rotating shaft of the worm shaft comprises at least one positioning groove annularly disposed, the body comprises at least on positioning portion, the at least one positioning portion is disposed in the at least one positioning groove correspondingly.

6. The locking structure according to claim 1, wherein the body comprises an engaging groove disposed, and the locking member of the worm shaft is protrudingly assembled in the engaging groove.

7. The locking structure according to claim 1, wherein the fixing base comprises a fixing plate and an abutting member, the fixing plate is pivotally assembled to the body, the abutting member is securely assembled to the fixing plate, and the linkage set is abutted against the abutting member.

8. The locking structure according to claim 1, wherein the locking member is a hook portion.

9. The locking structure according to claim 1, wherein the locking member is an anchor shaped hook member.

10. The locking structure according to claim 1, wherein the body comprises at least one supporting member protruded, the other end of the guide rod is slidably assembled to the supporting member.

11. The locking structure according to claim 1, further comprising a cover provided for enclosing the body.

* * * * *